United States Patent [19]
Bissi et al.

[11] Patent Number: 5,887,958
[45] Date of Patent: Mar. 30, 1999

[54] TRACK LINK ASSEMBLY HAVING POSITIVE PIN RETENTION

[75] Inventors: Maurizio Bissi, Ferrara, Italy; Jerry W. Gehrke, Pewaukee, Wis.

[73] Assignee: Berco S.P.A., Copparo, Italy

[21] Appl. No.: 803,715

[22] Filed: Feb. 21, 1997

[51] Int. Cl.⁶ .................................................. B62D 55/20
[52] U.S. Cl. .......................................... 305/201; 305/200
[58] Field of Search .................................. 305/103, 104, 305/106, 185, 200, 201, 204, 205

[56] References Cited

U.S. PATENT DOCUMENTS

| | | | |
|---|---|---|---|
| 2,598,828 | 6/1952 | Phelps | 305/196 |
| 4,149,758 | 4/1979 | Livesay | 305/202 |
| 4,222,616 | 9/1980 | Brewer . | |
| 4,618,190 | 10/1986 | Garman et al. . | |
| 5,069,509 | 12/1991 | Johnson et al. | 305/104 X |
| 5,183,318 | 2/1993 | Taft et al. . | |
| 5,201,171 | 4/1993 | Anderton et al. . | |
| 5,257,858 | 11/1993 | Taft | 305/204 |

FOREIGN PATENT DOCUMENTS

| | | | |
|---|---|---|---|
| 80/02059 | 10/1980 | WIPO | 305/204 |

*Primary Examiner*—Russell D. Stormer
*Attorney, Agent, or Firm*—Oblon, Spivak, McClelland, Maier & Neustadt, P.C.

[57] ABSTRACT

A track link assembly consists of two parallel arranged chains of links connected end to end, the links of each chain being connected by a joint including a link pin press fit in the bore of the outboard end collar. In order to limit the movement of the collar on the link pin and prevent excessive end play at the seal, a snap ring is fitted on a portion of each end of the link pin which extends outward from the bore of the outboard end collar. One or more protrusions on the outer surface of the boss protect the snap ring from being knocked off during use.

11 Claims, 2 Drawing Sheets

TRACK LINK ASSEMBLY HAVING POSITIVE PIN RETENTION

BACKGROUND OF THE INVENTION

1. Field of the Invention

The present invention is directed to a track link for a track type vehicle. More generally, it is directed to a one piece track link assembly including parallel chains of track links connected end-to-end by link pins, with positive retention of the pins in the links.

2. Description of the Related Art

Tracks composed of parallel arranged chains of track links, connected end-to-end at overlapping inboard and outboard ends of the respective links, are well known for use with heavy equipment such as earth moving vehicles. Typically the links of each chain, and the parallel arranged chains of links, are connected by pivot joints comprised of link pins which are press fitted in bores at the outboard ends of corresponding links of each chain, and bushings rotatably mounted on the links and press fitted in the bores of the outboard ends of adjacent corresponding links of each chain. The bearing surfaces between the respective link pins and bushings are lubricated by a lubricating oil reservoir in the link pin, which is sealed by seal members having seal lips which bear against the ends of the respective bushings.

The link pins are press fit in their bores with high pressure in an effort to prevent outward movement of the respective links on the pins, which movement may occur as result of the working forces exerted on the track during the operation of the vehicle. Such movement, if present, causes the joints to become loose and develop what is commonly referred to as end play. End play is especially undesirable in chains having sealed link lubrication since it reduces seal pressures at the seal lips, which may permit the lubricant to leak past the seals and the ingress of abrasive materials. The loss of lubricant and the ingress of abrasive materials can lead to excessive wear and premature failure of the track.

Efforts have therefore been made to minimize end play in the track link assemblies. For example, in U.S. Pat. No. 4,222,616, gussets mounted to the track shoes bear against the ends of the pins and prevent their outward deflection. However, this requires the use of special track shoes.

U.S. Pat. No. 4,618,190 uses retainers formed in cavities of the links for preventing end play. However, appropriate grooves must be machined in both the pins and the links.

In U.S. Pat. No. 5,201,171, the outboard end collars of the links have pin bosses with bores through which the link pins extend. Nodules are mechanically formed in the pin bosses and protrude inwardly from the bores into grooves at the ends of the pins to prevent end play. However, such permanent deformation of the bosses makes it difficult to remove the pins from the links for repair and/or replacement. For example, it is common practice to disassemble the chain so that the bushings can be rotated 180° to expose a new wear surface to the drive sprocket. This is very difficult in the case of the deformed link bosses of U.S. Pat. No. 5,201,171.

Snap rings have been used to retain link pins of specialized split link type track links, for example the Berco CR4659 split link used to connect end of a link track. However, they have never been used in regular links to prevent end play.

SUMMARY OF THE INVENTION

It is an object of the invention to provide a one piece track link assembly with reduced end play.

It is a further object of the invention to provide a one piece track link assembly in which the link pins can be readily separated from the links for repair and/or replacement.

According to a feature of the invention, the above and other objects are achieved by a one piece track link for a track type vehicle, including an inboard end collar, and outboard end collar, a boss formed on the outer surface of the outboard end collar, a bore extending through the outboard end collar from the inner surface thereof to the outer surface of the boss, and at least one outwardly extending protrusion formed on the outer surface of the boss and extending circumferentially at least partially around the bore.

According to another feature of the invention, the above and other objects are achieved by a track link assembly including a one piece link having inboard and outboard end collars, a boss formed on the outer surface of the outboard end collar, a bore extending through the outboard end collar from the inner surface to the outer surface of the boss, at least one outwardly extending protrusion formed on the outer surface of the boss and extending circumferentially at least partially around the bore. A link pin has an end press fitted in the bore extending through the outboard end collar.

According to another feature of the invention, the above and other objects are achieved by a track link assembly comprising two parallel arranged chains of links connected end to end. At least one of the links of each of said chains comprises a one piece link having an inboard end collar and an outboard end collar. A boss is formed on the outer surface of the outboard end collar and has a bore extending therethrough. At least one outwardly extending protrusion is formed on the outer surface of the boss and extends circumferentially at least partially around the bore. A pivot joint between adjacent ones of the links of each of the chains of links, and between the two parallel arranged chains of links, comprises a link pin having ends press fitted in the bores extending through the outboard end collars of corresponding links of said two parallel arranged chains of links, a bushing rotatably mounted on the link pin between the corresponding links, wherein the bores of the inboard end collars of the links in each of said chains of links are mounted on the bushing so as to connect the links of each of said chains of links and a snap ring fitted on a portion of at least one end of the link pin extending outwardly from the bore.

According to another feature of the invention, the above and other objects are achieved by a track link assembly comprising a one piece track link having an inboard end collar, an outboard end collar having a boss formed on said outer surface thereof and a link pin having an end press fitted in the bore.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
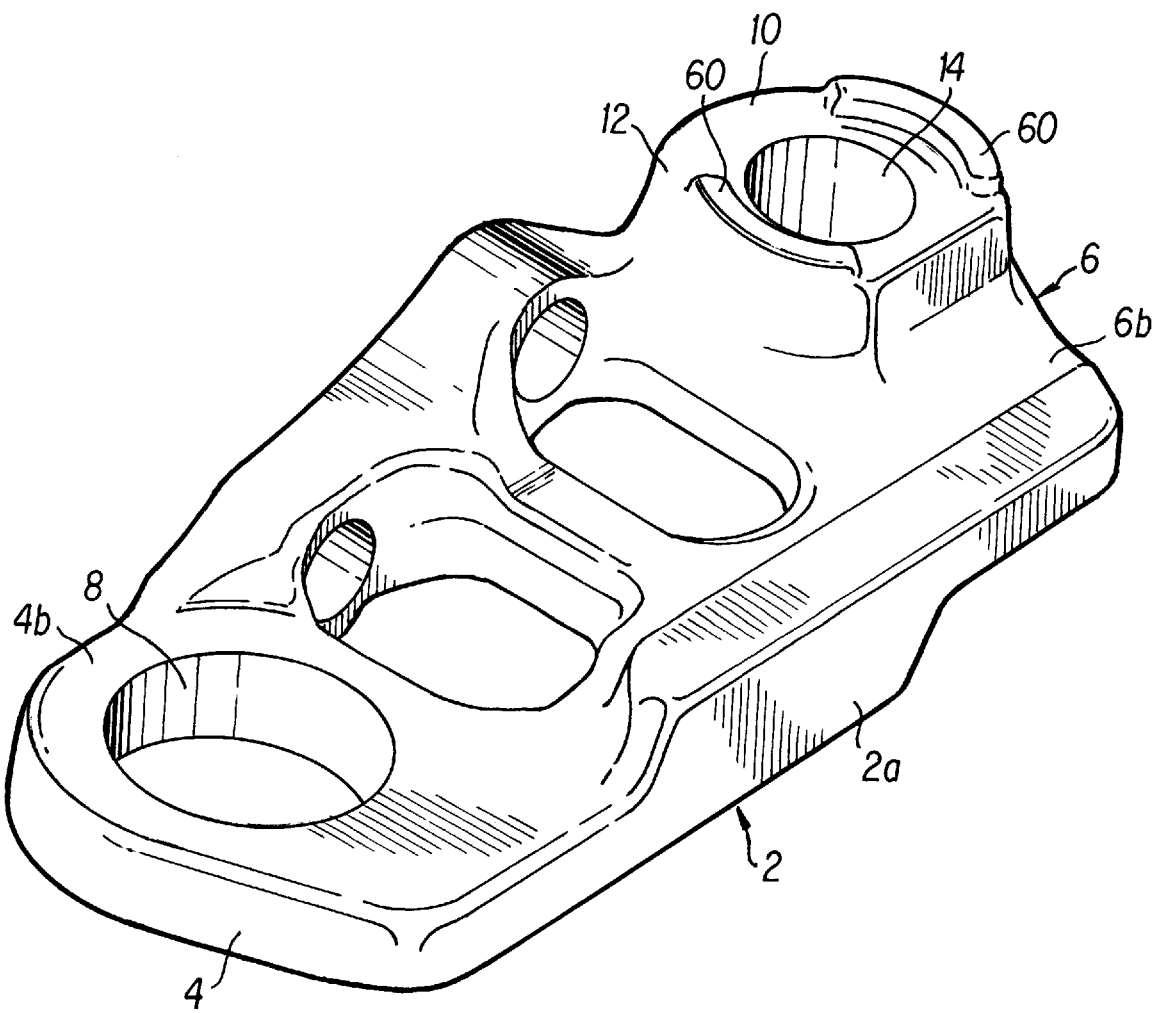
FIG. 1 is a perspective view of a track link incorporating the invention.

Referring now to the drawings, wherein like reference numerals designate identical or corresponding parts throughout the several views, FIG. 1 is a perspective view of a one piece track link incorporating the invention. As is conventional, the track link 2 includes an inboard end collar 4 at one end and an outboard end collar 6 at the other end. It also has a rail surface 2a as is conventional. The inboard end collar 4 has a bore 8 extending therethrough between inner surface 4a and the outer surface 4b thereof.

The outboard end collar 6 has an inner surface 6a and incorporates a boss 12 extending outwardly from its outer surface 6b. The boss 12 is formed unitarily with the outboard end collar and may be of a conventional design, except as set forth below.

A bore 14 extends through the outboard end collar from the inner surface thereof to the outer surface 10 of the boss. An annular recess 18 is formed in the inner surface of the outboard end collar and surrounds the bore 14.

Figure 2:
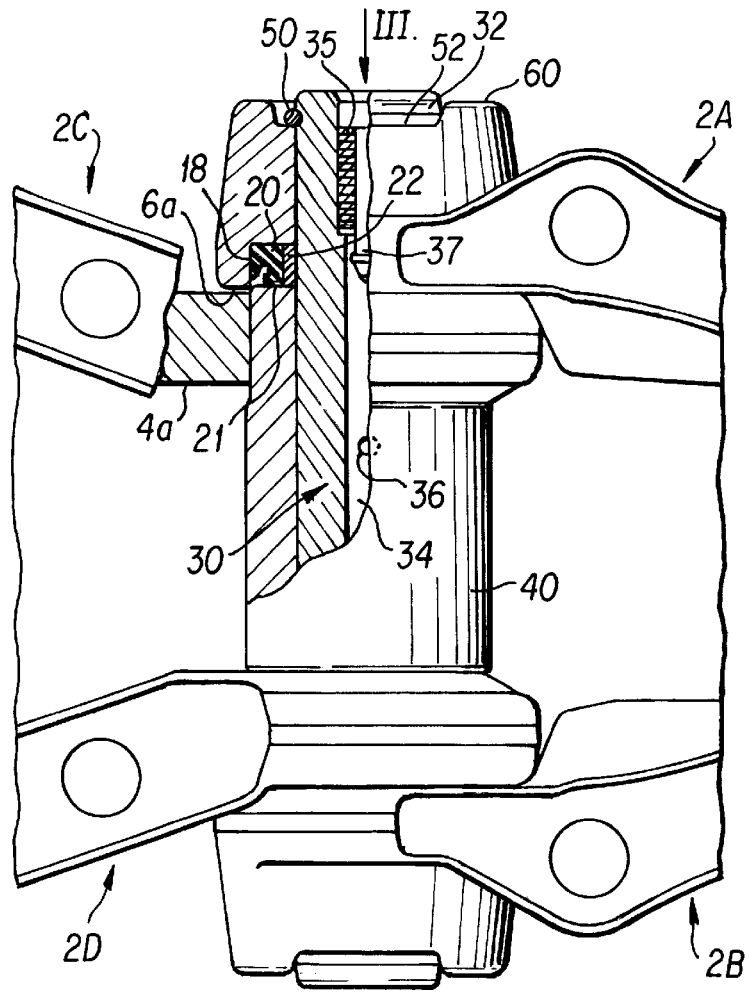
FIG. 2 is a detail, partly in section, of the joint between adjacent links, and between the link chains, in a track link assembly.
Figure 3:
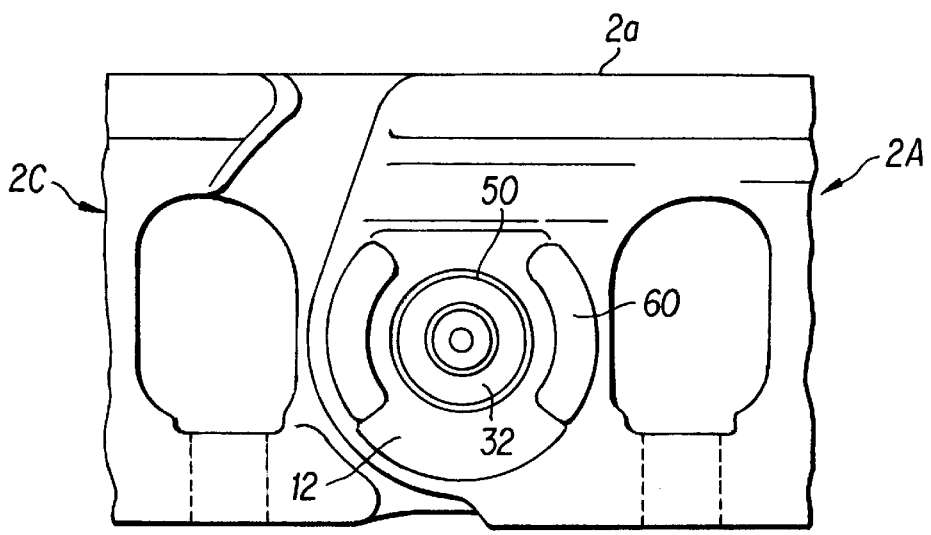
FIG. 3 is a detail, seen in the direction of the arrow III in FIG. 2, of the joint of FIG. 2.

Referring to FIG. 2, there is shown in detail the pivot joint region between two links 2A and 2C, or 2B and 2D, of a given chain, and between the parallel arranged chains. As can be seen, the outboard end collar of a given link 2A or 2B overlaps the inboard end collar of the adjoining link 2C or 2D in the respective chain in a conventional manner. The recess 18 contains a seal member 20, which may be a conventional elastomeric oil seal element such as that manufactured by the Chicago Rawhide Company. The seal member 20 may include a polyurethane seal lip 21 backed by a rubber load ring. A metal spacer 22 maintains a minimum spacing for the seal member.

A link pin 30 has ends which are press fitted in each of the outboard end bores 14 of corresponding links 2A and 2B. The ends of each of the link pins each have a portion 32 extending outwardly from the bore 14. The link pins may be conventional, except as noted below.

A conventional bushing 40 is rotatably mounted on the link pin 30 between the corresponding links 2A and 2B. The ends of the bushing 40 are press fitted within the inboard end bores 8 of the inboard end collars 4 of links 2C and 2D which are overlapping with the outboard end collars of the corresponding links 2A and 2B. A journal bearing is thus formed by the outer surface of the link pin 30 and the inner surface of the bushing 40, and so the links 2A and 2B are pivotally connected to each other and to the adjacent links 2C and 2D at the pivot joint.

Since the inner surface of the bushing 40 and the outer surface of the link pin 30 form bearing surfaces for this joint, they are lubricated by a lubricant, such as oil, forming a film therebetween. For this purpose, the link pin 30 may be hollow so as to form an oil cavity 34 which is plugged by the stopper 35 and plug 37 and which communicates with the bearing surfaces via radial passages 36 (only one is shown) in a conventional manner, thereby providing an adequate supply of lubricating oil to the bearing surfaces. Leakage of the lubricant supply is prevented by a seal formed between the lip 21 of the seal member 20 and the corresponding end of the bushing 40.

The link pins 30 are normally mounted in the bores 14 of the outboard end collars so as to leave a limited end play between the seal lips 21 and the corresponding ends of the bushing 40. However, this end play increases if forces acting on the track during operation of the vehicle to which it is mounted cause the outboard end collar to move outwardly relative to the end of the link pin 30. In this case, the compression of the seal lip 21 decreases, which permits leakage of the lubricant past the seal, possible ingress of contaminants and a reduced joint life.

According to the invention, in order to limit end play and minimize lubricant leakage, snap rings 50 may be mounted to the end portions 32 of the link pins which extend outward of the bores 14 in the outboard end collars. The snap rings 50 may be conventional snap rings. Preferably, the snap rings fit in annular grooves 52 formed in the end portions 32 of link pins. The outer surface 10 of the boss 12 bears against the snap ring 50 to prevent further outward movement of the outboard end collar on the link pin and thereby limit the end play at the seal. The snap ring 50 can be easily mounted or removed using conventional tools during the replacement and/or repair of the track links, e.g., for 180° rotation of the bushings to expose a new wear surface to the drive sprocket of the track drive.

In order to prevent the snap ring 50 from being inadvertently knocked off during operation, it is protected by the arcuate protrusions 60 formed on the outside surface of the boss. These protrusions 60 have heights and an arcuate extent sufficient to protect the snap ring. Although the preferred embodiment illustrates two arcuate protrusions, each of which is symmetric with respect to a diameter line of the bore, and each having an angular or circumferential extent of 90°, it may be appreciated that a single protrusion, or more than two protrusions may be provided, and that the angular extent of the protrusions may vary according to need.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the Unites States is:

1. A one piece track link for a track type vehicle, comprising:
   an inboard end collar;
   an outboard end collar having an inner surface and an outer surface;
   a boss formed on said outer surface of said outboard end collar and having an outer surface;
   a bore extending through said outboard end collar from said inner surface to said outer surface of said boss; and
   at least one outwardly extending protrusion formed on said outer surface of said boss and extending circumferentially at least partially around said bored, wherein said at least one protrusion comprises at least two arcuate protrusions which together extend around said bore by an angle of at least 180°.

2. The track link of claim 1 wherein said bore is enlarged adjacent said inner surface of said inboard end collar to form an annular groove in said inner surface of said inboard end collar.

3. The track link of claim 1 wherein said bore is enlarged adjacent said inner surface of said inboard end collar to form an annular groove in said inner surface of said inboard end collar.

4. A track link assembly comprising:
   a one piece link having an inboard end collar, an outboard end collar having an inner surface and an outer surface, a boss formed on said outer surface of said outboard end collar and having an outer surface, a bore extending through said outboard end collar from said inner surface to said outer surface of said boss, and at least one outwardly extending protrusion formed on said outer surface of said boss and extending circumferentially at least partially around said bore, wherein said at least one protrusion comprises at least two arcuate protrusions which together extend circumferentially around said bore by an angle of at least 180°; and a link pin having an end press fitted in said bore extending through said outboard end collar.

5. A track link assembly comprising:

two parallel arranged chains of links connected end to end, at least one link of each of said chains comprising a one piece link having:
  a) an inboard end collar having an inner surface, an outer surface and a bore extending through said inboard end collar from said inner surface to said outer surface thereof, and
  b) an outboard end collar having an inner surface, an outer surface, a boss formed on said outer surface of said outboard end collar and having an outer surface, a bore extending through said outboard end collar from said inner surface to said outer surface of said boss, and at least one outwardly extending protrusion formed on said outer surface of said boss and extending circumferentially at least partially around said bore, wherein said at least one protrusion comprises at least one arcuate protrusion extending circumferentially around said bore by an angle of at least 180°; and a pivot joint between adjacent ones of said links of each of said chains of links and between said two parallel arranged chains of links, each said joint comprising:
  c) a link pin having ends press fitted in said bores extending through said outboard end collars of corresponding links of said two parallel arranged chains of links, and
  d) a bushing rotatably mounted on said link pin between said corresponding links, wherein the bores of the inboard end collars of the links in each of said chains of links are mounted on the bushing so as to connect the links of each of said chains of links.

6. The track link assembly of claim 5 wherein each of said bores is enlarged adjacent said inner surface of the respective said inboard end collar to form an annular groove in said inner surface of the respective said inboard end collar.

7. The track link assembly of claim 6 including a seal member in each of said annular grooves, wherein said seal members of each said joint each form a seal with respect to an end of the bushing of said joint.

8. The track link assembly of claim 7 including means in said link pin for lubricating rotational bearing surfaces between said link pin and said link, wherein said seal members seal a lubricating fluid of said lubricating means against leakage therepast.

9. A one piece track link for a track type vehicle, comprising:

an inboard end collar;

an outboard end collar having an inner surface and an outer surface;

a boss formed on said outer surface of said outboard end collar and having an outer surface;

a bore extending through said outboard end collar from said inner surface to said outer surface of said boss; and at least one outwardly extending protrusion formed on said outer surface of said boss and extending circumferentially at least partially around said bore, wherein said at least one protrusion comprises two arcuate protrusions, each of said two arcuate protrusions extending circumferentially around said bore by an angle of 90°, said protrusions being symmetrical about a diametrical line of said bore.

10. A track link assembly comprising:

a one piece link having an inboard end collar, an outboard end collar having an inner surface and an outer surface, a boss formed on said outer surface of said outboard end collar and having an outer surface, a bore extending through said outboard end collar from said inner surface to said outer surface of said boss, and at least one outwardly extending protrusion formed on said outer surface of said boss and extending circumferentially at least partially around said bore, wherein said at least one protrusion comprises two arcuate protrusions, each of said two arcuate protrusions extending around said bore by an angle of 90°, said protrusions being symmetrical about a diametrical line of said bore; and a link pin having an end press fitted in said bore extending through said outboard end collar.

11. A track link assembly comprising:

two parallel arranged chains of links connected end to end, at least one link of each of said chains comprising a one piece link having:
  a) an inboard end collar having an inner surface, an outer surface and a bore extending through said inboard end collar from said inner surface to said outer surface thereof, and
  b) an outboard end collar having an inner surface, an outer surface, a boss formed on said outer surface of said outboard end collar and having an outer surface, a bore extending through said outboard end collar from said inner surface to said outer surface of said boss, and at least one outwardly extending protrusion formed on said outer surface of said boss and extending circumferentially at least partially around said bore, wherein said at least one protrusion comprises two arcuate protrusions, each of said two arcuate protrusions extending around said bore by an angle of 90°, said protrusions being symmetrical about a diametrical line of said bore; and a pivot joint between adjacent ones of said links of each of said chains of links and between said two parallel arranged chains of links, each said joint comprising:
  c) a link pin having ends press fitted in said bores extending through said outboard end collars of corresponding links of said two parallel arranged chains of links, and
  d) a bushing rotatably mounted on said link pin between said corresponding links, wherein the bores of the inboard end collars of the links in each of said chains of links are mounted on the bushing so as to connect the links of each of said chains of links.

\* \* \* \* \*